US006856984B2

(12) United States Patent
Slaikeu

(10) Patent No.: US 6,856,984 B2
(45) Date of Patent: Feb. 15, 2005

(54) SYSTEM FOR THE ANALYSIS OF ORGANIZATIONAL CONFLICTS

(75) Inventor: Karl A. Slaikeu, Austin, TX (US)

(73) Assignee: Chorda Conflict Management, Inc., Austin, TX (US)

( * ) Notice: Subject to any disclaimer, the term of this patent is extended or adjusted under 35 U.S.C. 154(b) by 660 days.

(21) Appl. No.: 09/784,432

(22) Filed: Feb. 15, 2001

(65) Prior Publication Data

US 2001/0007106 A1 Jul. 5, 2001

Related U.S. Application Data

(63) Continuation-in-part of application No. 09/030,034, filed on Feb. 25, 1998, now abandoned.

(51) Int. Cl.[7] ............................................... G06F 17/00
(52) U.S. Cl. ........................................................ 706/60
(58) Field of Search ........................ 706/50, 60; 705/41

(56) References Cited

U.S. PATENT DOCUMENTS

| 5,592,378 A | * | 1/1997 | Cameron et al. .............. 705/27 |
| 5,603,025 A | * | 2/1997 | Tabb et al. ...................... 707/2 |
| 5,608,789 A | * | 3/1997 | Fisher et al. ........... 379/201.03 |
| 5,611,052 A | * | 3/1997 | Dykstra et al. ................ 705/38 |
| 5,652,786 A | * | 7/1997 | Rogers .................... 379/91.01 |
| 5,995,948 A | * | 11/1999 | Whitford et al. .............. 705/41 |

OTHER PUBLICATIONS

A.R. Elangovan, "Managerial Third–Party Dispute Intervention: A Prescriptive Model of Strategy Selection," Academy of Mangerial Review, vol. 20, No. 4, pp. 800–830, 2000.*
Karl A. Staikeu, When Push Comes to Shove, (1996).*
Karl A. Staiken and Ralph H. Hasson, Controlling the Costs of Conflict (1998).*

Kayman et al., Expert Systems in Alternative Dispute Resolution, Proceeding of the Third International Conference on Artificial Intelligence & Law, May 1991, pp. 207–214.*
Intergroup conflict and conflict management in the R&D divisions of four aerospace companies Chan, M.; Engineering Management, IEEE Transactions on , vol.: 36, Issue: 2, May 1989 pp.:95–104.*
Logic–based knowledge representation for authorization with delegation Ninghui Li; Feigenbaum, J.; Grosof, B.N.; Computer Security Foundations Workshop, 1999. Proceedings of the 12th IEEE , Jun. 28–30, 1999 pp.:162–174.*
Poulymenakou et al., "Knowledge Acquisition to Facilitate Organizational Problem Solving," Proceeding of the 1990 ACM SIGBDP Conference on Trends and Directions in Expert Systems, pp. 181–188.*

(List continued on next page.)

Primary Examiner—Anthony Knight
Assistant Examiner—Michael B. Holmes
(74) Attorney, Agent, or Firm—J. Nevin Shaffer Jr.

(57) ABSTRACT

An expert system for the analysis of organizational conflict handling procedures to determine the absence or presence of predetermined rules and a preferred path for conflict resolution uses a computer system and computer instructions installed on, or linked to, the computer system containing predetermined rules for the resolution of organizational conflicts. Information is gathered for analysis of existing organizational conflict handling procedures for review via a predetermined conflict resolution analysis template that specifies a preferred path for conflict resolution across four boxes (options), and with the same preferred path template used to evaluate processes within each of the four boxes. The predetermined conflict resolution template yields recommendations, in accordance with the preferred path for conflict resolution, for modification of the existing internal organizational conflict handling procedures and the generation of new organizational conflict handling procedures.

19 Claims, 3 Drawing Sheets

OTHER PUBLICATIONS

Samarasan, "Collaborative Modeling and Negotiation," Conference Sponsored by ACM SIGOID and IEEECS TC–OA on Office Information Systems, pp. 9–21.*

Hybrid High–Level Nets, Ralf Wieting, Proceeding of the 1996 Winter Simulation Conference ACM.*

Some new factors influencing user information satisfaction: implications for systems professionals, Kailash Joshi, William C. Perkins, Robert P. Bostrom, SIGCPR: ACM Special Interest group on Computer Personnel Research, 1986, pp. 27–42.*

Flexible conflict detection and mangement in collaborative applications, W. Keith Edwards, SIGGRAPH: ACM Special Interest Group on Computer Graphics and Interactive Techniques 1997, pp. 139–148.*

Conflict management and group decision support systems, Marshall Scott Poole, Michael Holmes, Geradine DeSanctis, Computer Supported Cooperative Work, 1988, pp. 227–243.*

Karl A. Slaikeu, When Push Comes to Shove (1996), Entire Book.

Karl A. Slaikeu and Ralph H. Hasson, Controlling the Costs of Conflict (1998), Entire Book.

Kayman et al., "Expert Systems in Alternative Dispute Resolution," Proceedings of the Third International Conference on Artificial Intelligence & Law, pp. 207–214.

Poulymenakou et al., "Knowledge Acquisition to Facilitate Organisational Problem Solving," Proceedings of the 1990 ACM SIGBDP Conference on Trends and Directions in Expert Systems, pp. 181–188.

Samarasan, "Collaborative Modeling and Negotiation," Conference Sponsored by ACM SIGOIS and IEEECS TC–OA on Office Information Systems, pp. 9–21.

Goldman et al., "Precedent–Based Legal Reasoning and Knowledge Acquisition in Contract Law: A Process Model," Proceedings of the First International Confernece on Artificial Intelligences & Law, pp. 34–43.

Berman, et al., "The Potential of Artificial Intelligence to Help Solve the Crisis in Our Legal System," Communications of the ACM, vol. 3, No. 8, pp. 928–938.

Klein, "The Long Wait for Automated Experts," Credit Card Management, Sep. 1991, pp. 80.

CADRE Products and Solutions (online). NeuralTech, Inc. Apr. 1996 [retrieved on 01–20–2000]. Retrieved from the Internet: <URL: www.neuraltech.com/products/products.html>.

A.R. Elangovan, "Managerial Third–Party Dispute Intervention: A Prescriptive Model of Strategy Selection," Academy of Management Review, vol. 20, No. 4, pp. 800–830, ABI/INFORM [online] [retrieved on 08–12–2000]. Retrieved from DialogWeb <http://www.dia.

"The Mediator—Mediation, Negotiation and Conflict Resolution Software," More Than Fair and Envy–free Conflict Resolution, [online] [retrieved on 8–12–2000]. Retrieved from the Internet <http://www.mcn.org/c/rsurratt/conflict.html>.

Keashly, et al., "The Comparative Utility of Third Party Consultation and Mediation Within a Complex Simulation of Intergroup Conflict", Human Relations, vol. 46, No. 3, pp. 371–393 [online] [retrieved on 8–12–2000]. Retrieved from Dialog Web http:/www.dialogweb.com/cgi/dwclient?dw-command.

C. Schweber, "The Use of Technology in Conflict Resolution," Paper presented at European Conference on Peacemaking and Conflict Resolution, Oct. 1994 [online] [retrieved on 8–12–2000]. Retrieved from Internet http:/www.batnet.com/oikoumene/arbtadr.html.

* cited by examiner

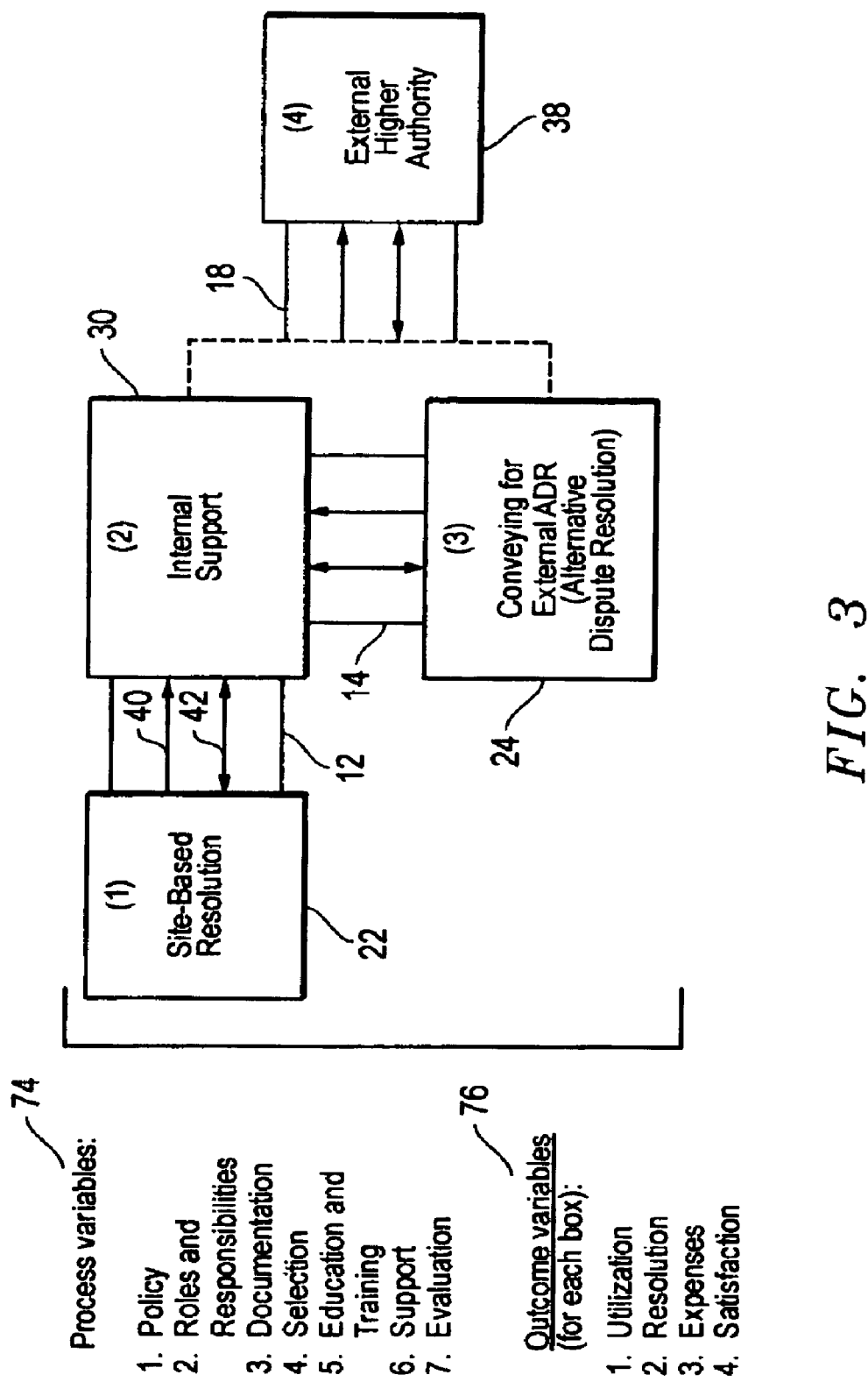

SYSTEM FOR THE ANALYSIS OF ORGANIZATIONAL CONFLICTS

CROSS REFERENCE TO RELATED APPLICATIONS

This application is related to, and is a continuation-in-part of, pending U.S. patent application Ser. No. 09/030,034, filed Feb. 25, 1998, and entitled "EXPERT SYSTEM FOR THE ANALYSIS OF INTERNAL CONFLICTS", now abandoned.

BACKGROUND OF THE INVENTION

This invention relates to an expert system for the analysis of organizational conflict handling procedures. Specifically, this invention relates to an expert system comprising both a method and an apparatus for the analysis of organizational conflict handling procedures to determine the absence or presence of adherence or lack thereof to predetermined rules and a preferred path for dispute resolution.

While no two businesses are identical, every business has essentially the same business interests. Those business interests include controlling costs, increasing market share, meeting/exceeding customer expectations, strengthening long-term business relationships, and increasing the value of the business. Another common element in every business is conflict. Predictable conflicts occur in three areas. These three areas are employees, customers, and business partners. Businesses that ignore these predictable areas of conflicts do so at their peril. Unresolved conflict contributes to high costs in organizations, and one of the most measurable costs is outside litigation expenses. It is not uncommon for large organizations to have litigation expenses in the seven and eight figure range. Litigation expenses represent a true waste for any business, since these expenses detract directly from the bottom line. Alongside legal expenses, however, are other costs associated with unresolved conflict, such as emotional wear and tear, lost business relationships, and high turnover. Other than abject neglect, the source of these unresolved conflict costs to businesses can be traced directly to weak systems for handling organizational conflicts. Weak systems are indicated by poor complaint-handling, communication, and negotiation skills of employees and managers; by grievance procedures based on a higher authority; by overuse of litigation to resolve disputes; by simply adding alternative dispute resolution (ADR) to an already weak system; by lack of continuity in systems for employees, customers, and partners; and by inadequate prevention procedures. Indicators of weak systems are also indirectly reflected by high litigation expenses, lost productivity, bad press, strikes/poor labor relations, lost business opportunities, and internal arguments over how or when to use alternative dispute resolution. Just as the prior art solution to solving unresolved conflict by way of litigation has been found to be no sure answer, yet expensive, so has the prior art solution of requiring singular solutions of such as alternative dispute resolution, or training of managers and employees, or other similar innovations such as online mediation for any and all unresolved conflicts.

What is required, and what applicant has developed, is an expert system for the analysis of organizational conflict handling procedures across and within all four boxes of an organizational template to determine the presence or absence of adherence or lack thereof to predetermined rules and a preferred path for dispute resolution. This is followed with recommendations for new organizational conflict handling procedures that lead to early resolution of cases, and hence, savings in time and money to all parties to the conflict. The expert system for analysis disclosed herein allows for diagnosis of existing organizational weaknesses, and then recommends corrective action (systems changes) through rewiring organizational conflict handling procedures, selecting key staff, and training all employees, thereby producing outcomes that benefit the entire organization. The expert system has achieved reductions in outside litigation expenses up to eighty percent annually. Alongside this material benefit are improved morale and cooperation in the workplace, retention of valued of employees, and strengthened long-term business relationships with customers and partners.

SHORT STATEMENT OF THE INVENTION

Accordingly, the expert system for the analysis of existing organizational conflict handling procedures to determine the absence or presence of adherence or lack thereof to predetermined rules and a preferred path for dispute resolution and for recommending new organizational conflict handling procedures comprises the steps of identifying existing organizational conflict handling procedures. Thereafter, a predetermined conflict resolution analysis template defining a preferred path for the resolution of conflicts is applied, for identifying indicators of weakness in conflict handling procedures, to the existing organizational conflict handling procedures. Finally, recommendations are created for new organizational conflict handling procedures that adhere to the preferred path in accordance with the predetermined rules for dispute resolution. The method includes rules for the analysis of a plurality of preselected conflict resolution process variables. In a preferred embodiment, the conflict resolution process variables are selected from a list including policy, rules and responsibilities, documentation, selection, education and training, support, and evaluation. In this embodiment, recommendations are for modifications to conform the existing organizational conflict handling procedures to include at least those from this list. Further, in a preferred embodiment, the method include rules defining a preferred path for handling conflict from site-based resolution, to internal support resolution, to convening for external alternative dispute resolution, and, finally, to external higher authority resolution. Still further, the computer instructions and method includes rules for review of the outcome of each organizational conflict analysis performed, including utilization of the recommended system, resolution of the particular conflict, expenses associated therewith, and satisfaction of the parties thereto.

This expert system acknowledges four ways to resolve conflict: avoidance, as in no action to resolve the conflict is taken; collaboration, in which individual initiative, negotiation by the parties, and mediation by third parties are solicited; higher authority, wherein the chain of command is utilized or external arbitration or litigation are resorted to; and/or unilateral power play, wherein physical violence, strikes, and behind the scenes maneuvering take place. Applicant's expert system for the analysis of organizational conflict handling procedures orders the four ways so as to follow a preferred path to resolve conflict for low cost resolution early in the life of any conflict, focusing by way of computer hardware and software on systemic collaboration first with other options as backup. Further, applicant's expert system emphasizes internal systems that precede external alternative dispute resolutions, which has the effect of preventing minor complaints and conflicts from escalating into expensive disputes.

Applicant's expert system includes rules for preselected conflict resolution process variables. Importantly, seven significant conflict resolution variables have been identified, those being: policy, roles and responsibilities, documentation, selection, education and training, support, and evaluation. These preselected conflict resolution variables are used in the analysis of preexisting organizational conflict handling procedures so as to identify weakness and recommend corrections. By way of application of these conflict resolution variables, a preferred path is delineated so that organizational conflicts pass initially through individual site-based resolution initiatives, then to internally supported negotiations, then, if necessary, to external mediations, informal and formal, and lastly, to higher authority, internal or external. Further, once the information concerning the existing organizational conflict handling procedure is identified, a recommendation concerning change to that procedure is made. Once those changes are implemented, the resultant new organizational conflict handling procedure is periodically evaluated by reference to outcome variables, including utilization, resolution, expense, and satisfaction.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 3 is a schematic illustrating the preselected conflict resolution process variables considered in accordance with the predetermined rules and the outcome variables utilized in analysis of the existing conflict handling procedures.

DETAILED DESCRIPTION OF THE PREFERRED EMBODIMENT

Figure 1:
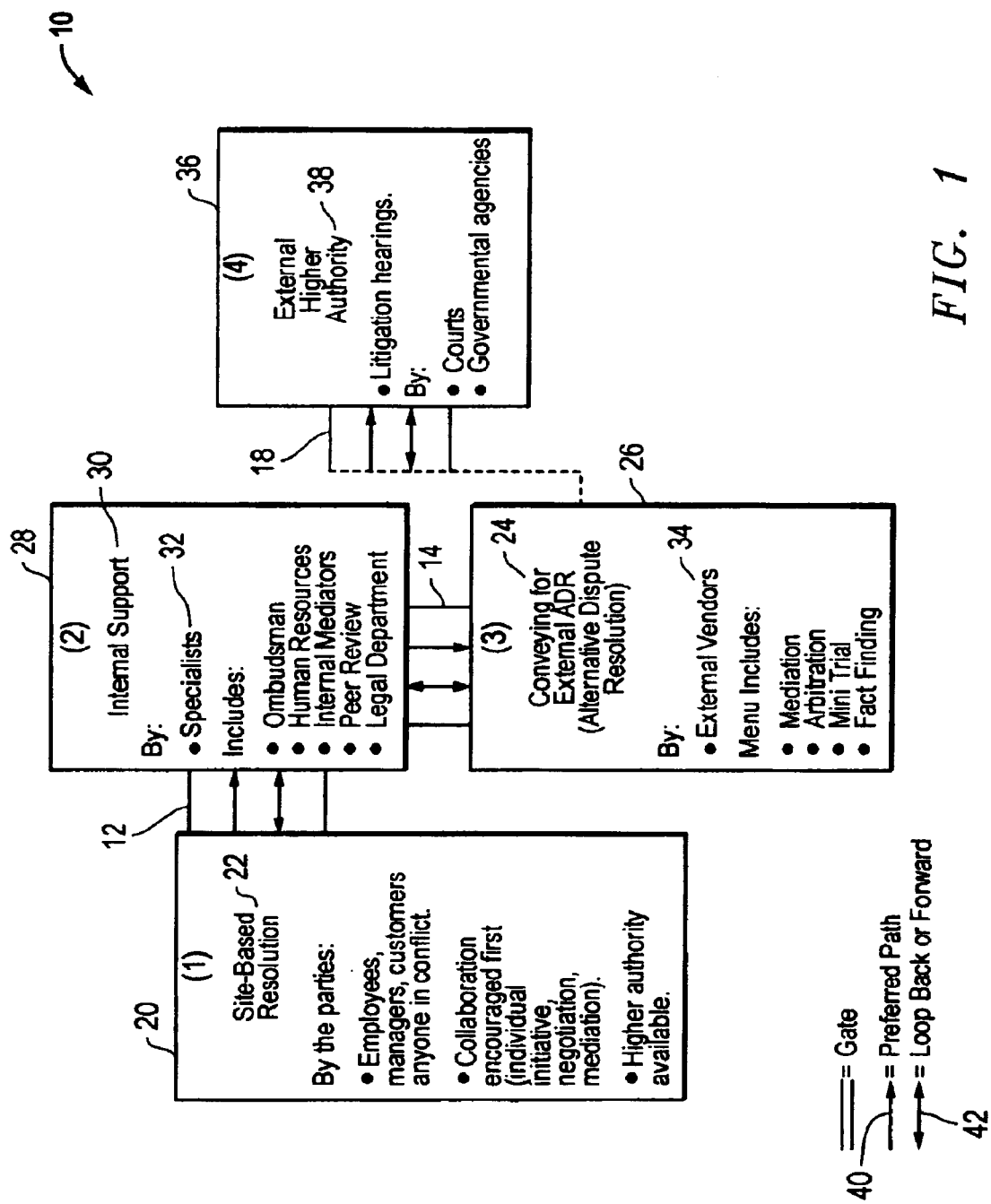
FIG. 1 is a schematic illustrating a predetermined conflict resolution analysis template of the present invention defining a preferred path for the resolution of conflicts from Box 1 to Box 4.
Figure 2:
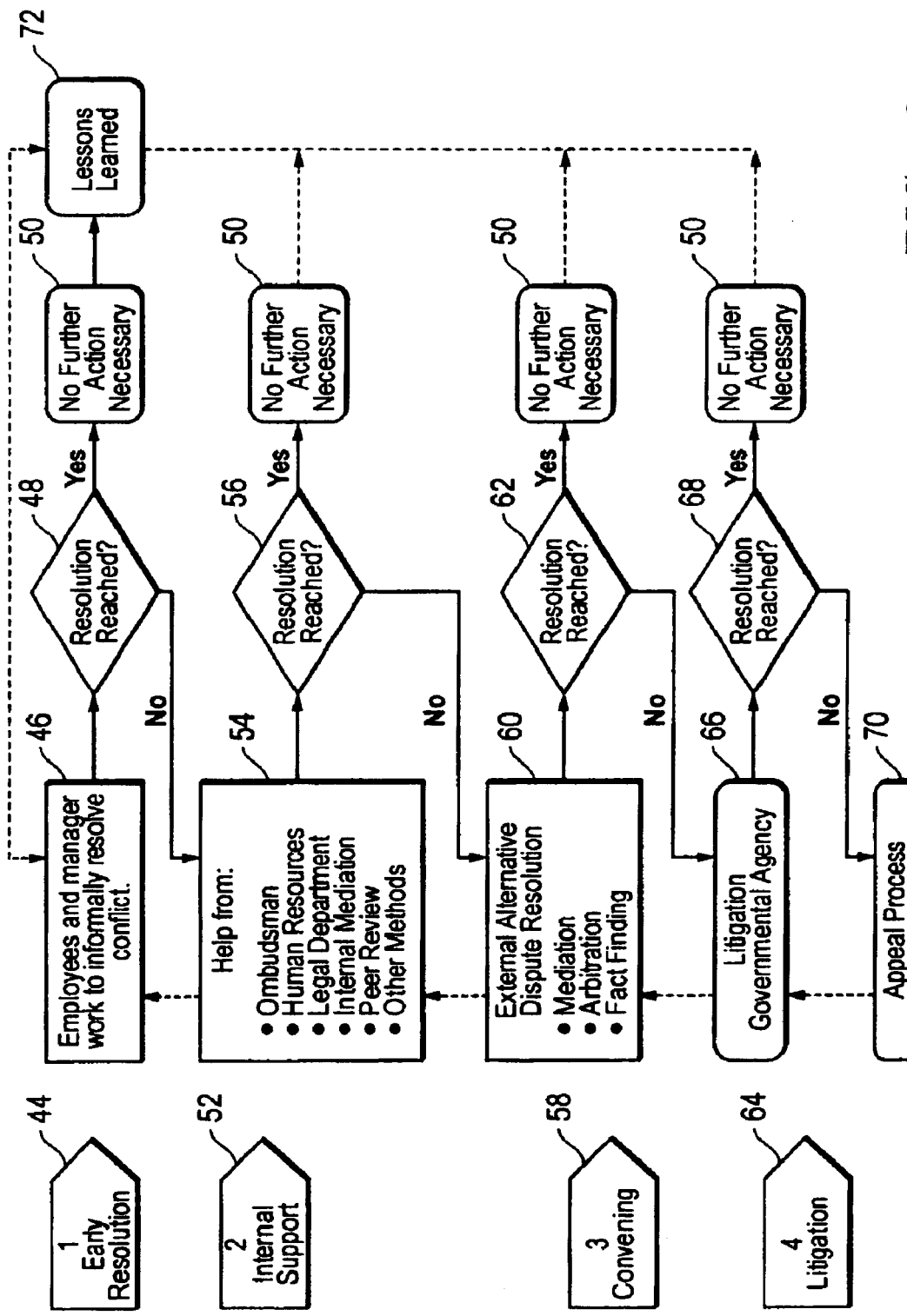
FIG. 2 is a flow chart illustrating the preferred path of the system for the analysis of organizational conflicts of the present invention.

The preferred embodiment of the present invention is illustrated by way of example in FIGS. 1–3. With specific reference to FIG. 1, the expert system for the analysis of organizational conflict handling procedures 10 is illustrated showing the preferred path through gates 12, 14 and 18 and the four Boxes (1), (2), (3), and (4) through which organizational conflicts are directed. A computer system, of any type known in the art and not described or disclosed more fully hereafter, is utilized, by way of example, in accordance with a preferred embodiment of this invention by the installation and/or linking of a computer readable media on the computer system containing instructions for a predetermined conflict resolution analysis template defining a preferred path for the resolution of conflicts. In its most basic form, the computer instructions analyze the flow of cases within the organization according to the preferred path for cost control. In accordance with the template, block 20 illustrates the first preferred path stage for dispute resolution, that being site-based resolution 22. In accordance with the template, the preferred path site-based resolution 22 encourages resolution of organizational conflicts by the parties, to wit, employees, managers, customers, and anyone in conflict. Further, collaboration is encouraged first by means of individual initiative, negotiation, and mediation. That is, the rules require initially that conflicts pass along the preferred path from block 20 site-based resolution 22 to block 28 internal support 30.

This second level of organizational conflict resolution is accomplished by specialists 32, including, but not limited to, ombudsman, human resources personnel, internal mediators, peer review personnel, and corporate counsel, i.e., legal department assistance, all of whom assist the parties in resolution of the case/conflict. From block 28 internal support 30, the predetermined rules urge, and the preferred path requires, continuing internal conflict problems to pass to a third opportunity for resolution through gate 14 to block 26 for the convening of external alternative dispute resolution (ADR) 24 personnel. ADR 24 may be accomplished by any known procedure, but the rules suggest external vendors 34 provide these services and the predetermined rules include a menu of choices thereunder, including, but not limited to, mediation, arbitration, mini trial, and fact finding procedures. Block 36 illustrates a fourth possible step, and the last block in the preferred path provided for under the predetermined rules, of resort to external higher authority 38 for resolution of internal conflicts. Resolution by way of external higher authority 38 is accomplished in any manner known in the art, such as litigation, hearings, and so forth, by courts, governmental agencies, and the like.

As illustrated in FIG. 1, the predetermined rules of the template and the preferred path of the present invention force comprehensive systemic evaluation of organizational conflicts to be considered early in the life of any conflict, ordering the options to begin with low-cost resolution early in the life of any conflict by way of preferred site-based resolution 22. Internal conflicts which cannot be resolved in block 20 by way of site-based resolution 22 are directed through gate 12 to block 28 for internal support 30.

As illustrated, the preferred path for dispute resolution in accordance with the terms of the predetermined rules are illustrated by way of single arrows 40. Additionally, the predetermined rules of the computer program and method of the present invention provide for looping backward or forward within the schematic as illustrated by double arrows 42, if the parties agree to do so.

Referring now to FIG. 2, the preferences of the method and computer instructions of the preferred embodiments of the invention evidenced by the predetermined conflict resolution analysis template and preferred path that serve as a blueprint for the resolution of organizational conflicts are illustrated. In the inevitable event of organizational conflict, early resolution 44 is preferred and employees and managers work to informally resolve the conflict as illustrated in block 46. If resolution is reached, as in block 48, no further action is necessary (block 50). If a resolution is not reached, internal conflict management rules direct the process to proceed to internal support 52, where employees and managers receive help from a variety of personnel, including ombudsman, human resources, legal department, internal mediation, peer review, and others in block 54. If a resolution is reached (block 56), no further action is necessary (block 50).

If a resolution is not reached in block 56, the rules require convening for external resolution 58 at block 60. External alternative dispute resolution (block 60) includes any and all types available, such as mediation, arbitration, and fact finding. If a resolution is reached at block 62, no further action (block 50) is necessary. If a resolution is not reached at block 62, external higher authority in the form of litigation 64 is indicated. Litigation by the courts or administrative process through governmental agencies (block 66) occurs in accordance with these rules as illustrated in this flow chart, then, as not the first but the next to the last step in conflict resolution. If conflict resolution is reached (block 68), no further action is necessary (block 50). If a resolution is not reached in block 68, administrative or legal appeal process 70 is indicated. In each step, once no further action is necessary (block 50), the predetermined rules of the present invention require periodic assessment of lessons learned (block 72) so that conflict resolution procedures, weaknesses, and strengths may be noted and amended as necessary.

Referring now to FIG. 3, a slightly modified schematic of the expert system for analysis of organizational conflict handling procedures 10 is illustrated, wherein preselected conflict resolution process variables 74 and outcome variables 76 applicable in each block are identified. Further, this schematic illustrates the preferred path the rules require from site-based resolution 22 through internal support 30 to convening for external ADR 24 and, as a last resort, referral to external higher authority 38. There is no provision, therefore, as illustrated, for direct resort from site-based resolution 12 to convening for external ADR 24 or elsewhere. Nonetheless, FIG. 3 does illustrate an optional embodiment wherein resort to external higher authority 38 may be had directly from internal support 30.

An integral part of the expert system for analysis of organizational conflict handling procedures 10 is the provision in the predetermined rules for analysis of preselected conflict resolution variables 74, which are designed to complement the previously described rules in analyzing information obtained on existing organizational conflict handling procedures so that recommendations consistent with the establishment of an expert system for conflict resolution will be obtained. These variables 74 ensure that the preferred path for cost control is adhered to. While the variables 74 applicant has selected for incorporation into the rules of its program are discussed more fully hereafter, it is by no means suggested that these are the only variables that may be utilized. Instead, it is suggested that these variables are critical for the expert system for analysis of organizational conflict handling procedure 10 as disclosed herein to function to its full capabilities.

The first conflict resolution variable 74 to be considered is policy. The rules require that a policy statement be written that applies the preferred path (collaboration first!) to all employment, customer, and partner (commercial) issues. Secondly, the roles and responsibilities of each of the following individuals are detailed as to what role they are to play in the early resolution of conflicts:

(a) employees;

(b) managers; and (c) specialists, such as ombudsman, human resources, attorneys, internal mediators, external conveners, external ADR vendors.

Documentation is the next variable 74 to be considered under the rules, wherein all written and electronic documents are required to channel all potential conflicts sequentially through the gates of the preferred path as illustrated in either FIG. 1 or 3. This includes employee brochures, videos for new employees, press releases, supervision manuals, and all other corporate documents.

The rules regarding the "selection" variable 74 strengthen the talent base within an enterprise for the skills of collaboration and conflict management. This is done by developing selection criteria concerning collaboration and then revising the selection/performance review/promotion procedures to include assessment of an individual's talent for collaboration. Further, selection criteria is integrated into a skills training program and ultimately ombudsman and conveners are selected from those individuals demonstrating these talents best.

Further, the rules require a review of the education and training process and result in recommendations for implementing training to support the new organizational conflict handling procedure. Training for the implementation of the changes to the existing organizational conflict handling procedures includes an orientation for supervisors and the entire workforce. This training educates the individuals as to the nature of the program, the benefits of the program for all employees, and links conflict management to the company's strategic initiatives.

Subsequently, the training element includes training in-house specialists in the core skills of dispute resolution. This is designed to equip those who staff the program with the necessary skills to resolve disputes. Finally, an essential element of the recommendation is training all employees and managers for prevention and early intervention in all future conflict situations. As illustrated in FIGS. 1 and 3, early resolution is the starting place of the preferred path for the expert system for the analysis of organizational conflicts handling procedures 10 in every case.

Once existing organizational conflict handling procedures have been revised, support for the new organizational conflict handling procedures is required under the rules. The support mechanisms are defined for both the employees and managers and require ongoing support in implementing and evaluating the revised process.

The last variable 74 in FIG. 3 relates to block 72 lessons learned (FIG. 2), wherein the rules require a periodic review of the preselected conflict resolution variables according to the template defining the preferred path and indicating if additional modifications to the new organizational conflict handling procedures are necessary. The four key areas for evaluation of the outcome variables 76 (FIG. 3) for the resolution of new conflicts are the expenses involved, the satisfaction of the employer and employees, utilization of the recommended preferred path flow chart, and the ultimate resolution of the conflict.

By way of the present invention, an expert system for the analysis of organizational conflict handling procedures to determine the absence or presence of predetermined rules and adherence to a preferred path for dispute resolution is disclosed. The system is implemented, for example, by utilization of a computer system, again of any known type, in conjunction with a computer instructions containing predetermined rules for dispute resolution to regulate the flow of cases. As illustrated in FIG. 2, the existing organizational conflict handling procedures are first analyzed by applying a predetermined conflict resolution analysis template defining a preferred path for the resolution of conflicts, for identifying indicators of weakness in conflict handling procedures as illustrated, again, in FIG. 2. Once the existing organizational conflict handling procedure has been examined in accordance with the template rules, recommendations are provided for new organizational conflict handling procedures that adhere to the preferred path so as to insure a process results that encourages early resolution by the parties on-site. In a preferred embodiment, the preferred path begins in block 20, Box 1 in every case. The next required gate on the preferred path is to obtain internal support from specialists in block 28, Box 2. The next required gate, in a preferred embodiment, is the convening of external alternative dispute resolution providers in block 26, Box 3. Only then do the rules allow for the process to pass through gate 18 to external higher authority dispute resolution alternatives, such as litigation and governmental agency oversight in block 36, Box 4. Applicant has found that the provision of the template and preferred path required by these rules and the modification of existing conflict handling procedures in accordance with recommendations resulting from analysis of an existing conflict handling procedure results in significant cost savings on the order of fifty to eighty percent of the cost to the organization of the continued use of existing organizational conflict handling procedures.

Any existing organizational conflict handling process will be made better by review in accordance with the predetermined rules and the preferred path disclosed herein so that, while the present invention has been disclosed in connection with the preferred embodiment thereof, it should be understood that there may be other embodiments which fall within the spirit and scope of the invention as defined by the following claims.

What is claimed is:

1. A method for the analysis of existing organizational conflict handling procedures and recommending new organizational conflict handling procedures for the resolution of conflicts comprising the steps of:
   a) identifying existing organizational conflict handling procedures:
   b) applying a predetermined conflict resolution analysis template defining a preferred path for resolution of conflicts, for identifying indicators of weakness in conflict handling procedures, to said existing organizational conflict handling procedures; and
   c) creating recommendations for new organizational conflict handling procedures that adhere to the preferred path.

2. The method of claim 1 further comprising the step of requiring the new organizational conflict handling procedures to begin with site based resolution options for each new conflict.

3. The method of claim 1 further comprising the step of periodically reviewing preselected conflict resolution variables according to the template defining the preferred path and indicating if additional modifications to the new organizational conflict handling procedures are necessary in light of said review of the preselected conflict resolution variables.

4. The method of claim 3 wherein the step of reviewing preselected conflict resolution variables includes the step of selecting variables from the group consisting of: conflict handling policy, personnel roles and responsibilities for handling conflict, conflict handling procedures documentation, selection of personnel with conflict handling skills, personnel education and training for conflict handling, support for conflict handling initiatives, and evaluation of conflict handling outcomes.

5. The method of claim 1 wherein the preferred path further includes the step of examining internal site-based resolution options between parties in conflict, between said parties and others by collaboration, and between said parties by referral to internal higher authority.

6. The method of claim 1 wherein the step of identifying indicators of weakness includes the step of identifying: poor complaint handling; poor communication skills; poor negotiation skills; grievance procedures based on higher authority alone; overuse of litigation; adding ADR to a weak procedure; lack of continuity between conflict procedures for employees, customers, and business partners; and inadequate prevention procedures.

7. The method of claim 6 further comprising the step of identifying indirect indicators of weakness in the form of: high litigation expenses; lost/low productivity; bad press; strikes/poor labor relations; lost business; and internal disputes over how or when to use ADR.

8. The method of claim 1 further comprising the step of requiring each new conflict to proceed sequentially through the preferred path of four conflict resolution gates beginning with individual site based initiatives, followed by internally supported negotiations, followed by external mediation, and lastly by referral to higher authority.

9. The method of claim 3 wherein the step of periodically reviewing preselected conflict resolution variables comprises the step of evaluating: expenses involved, satisfaction of parties, utilization of new conflict handling procedures, and resolution of a new conflict.

10. A method for the analysis of existing organizational conflict handling procedures and recommending new organizational conflict handling procedures for the resolution of conflicts comprising the steps of:
    a) identifying existing organizational conflict handling procedures;
    b) applying a predetermined conflict resolution template defining a preferred path for resolution of conflicts, for identifying indicators of weakness in conflict handling procedures, to said existing organizational conflict handling procedures, wherein the preferred path for conflict resolution includes four conflict resolution gates beginning with individual site based initiatives, followed by internally supported negotiations, followed by external mediation, and lastly by referral to higher authority;
    c) creating recommendations for new organizational conflict handling procedures that adhere to the preferred path; and
    d) periodically reviewing preselected conflict resolution variables according to the template defining the preferred path and indicating if additional modifications to the new conflict handling procedures are necessary wherein the conflict resolution variables are selected from the group consisting of: conflict handling policy, personnel roles and responsibilities for handling conflict, conflict handling procedures documentation, selection of personnel with conflict handling skills, personnel education and training for conflict handling, support for conflict handling initiatives, and evaluation of conflict handling outcomes.

11. In a computer system with a database, computer readable media linked to the database for providing for the analysis of existing organizational conflict handling procedures and creating new organizational conflict handling procedures for the resolution of organizational conflicts, the computer readable media comprising:
    a) instructions for a predetermined conflict resolution template defining a preferred path for resolution of conflicts, for identifying indicators of weakness in said existing organizational conflict handling procedures;
    b) instructions for examining indicators of weakness in said existing organizational conflict handling procedures identified by said template; and
    c) instructions for modifying identified weaknesses in said existing organizational conflict handling procedures and creating new organizational conflict handling procedures that adhere to the preferred path.

12. The invention of claim 11 further comprising instructions requiring the new organizational conflict handling procedures to begin with site based resolution options for each new conflict.

13. The invention of claim 11 further comprising instructions for periodically reviewing preselected conflict resolution variables according to the template defining the preferred path and indicating if additional modifications to the new organizational conflict handling procedures are necessary.

14. The invention of claim 13 wherein the instructions for periodically reviewing preselected conflict resolution variables further include instructions for selecting conflict resolution variables from the group consisting of: conflict handling policy, personnel roles and responsibilities for handling conflict, conflict handling procedures documentation, selection of personnel with conflict handling skills, personnel education and training for conflict handling, support for conflict handling initiatives, and evaluation of conflict handling outcomes.

15. The invention of claim 11 wherein the instructions for a preferred path further comprise instructions for examining internal site-based resolution options between parties in conflict, between said parties and others by collaboration, and between said parties by referral to internal higher authority.

16. The invention of claim 11 wherein the instructions for identifying indicators of weakness includes instructions for identifying: poor complaint handling; poor communication skills; poor negotiation skills; grievance procedures based on higher authority alone; overuse of litigation; adding ADR to a weak procedure; lack of continuity between conflict procedures for employees, customers, and business partners; and inadequate prevention procedures.

17. The invention of claim 16 further comprising instructions for identifying indirect indicators of weakness in the form of: high litigation expenses; lost/low productivity; bad press; strikes/poor labor relations; lost business; and internal disputes over how or when to use ADR.

18. The invention of claim 11 further comprising instructions for requiring each new conflict to proceed sequentially through the preferred path of four conflict resolution gates beginning with individual site based initiatives; followed by internally supported negotiations, followed by external mediation, and lastly by referral to higher authority.

19. The invention of claim 13 wherein the instructions for periodically reviewing preselected conflict resolution variables further comprise instructions for evaluation of: expenses involved; satisfaction of parties; utilization of new conflict handling procedures; and resolution of a new conflict.

* * * * *